(12) United States Patent
Ozoe et al.

(10) Patent No.: US 9,104,335 B2
(45) Date of Patent: Aug. 11, 2015

(54) COMPUTER SYSTEM AND METHOD FOR MIGRATING VOLUME IN COMPUTER SYSTEM

(71) Applicant: HITACHI, LTD., Tokyo (JP)

(72) Inventors: Kenji Ozoe, Tokyo (JP); Taro Ishizaki, Tokyo (JP); Takeshi Nishikawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/371,128

(22) PCT Filed: Nov. 5, 2013

(86) PCT No.: PCT/JP2013/079891
§ 371 (c)(1),
(2) Date: Jul. 8, 2014

(65) Prior Publication Data
US 2015/0142999 A1  May 21, 2015

(51) Int. Cl.
*G06F 3/00* (2006.01)
*G06F 3/06* (2006.01)
*G06F 13/40* (2006.01)

(52) U.S. Cl.
CPC ............ *G06F 3/0655* (2013.01); *G06F 3/0604* (2013.01); *G06F 3/067* (2013.01); *G06F 13/4068* (2013.01)

(58) Field of Classification Search
None
See application file for complete search history.

(56) References Cited

U.S. PATENT DOCUMENTS

| | | | |
|---|---|---|---|
| 7,529,784 B2 * | 5/2009 | Kavuri et al. | 1/1 |
| 7,627,617 B2 * | 12/2009 | Kavuri et al. | 1/1 |
| 8,825,964 B1 * | 9/2014 | Sopka et al. | 711/152 |
| 2005/0210067 A1 | 9/2005 | Nakatani et al. | |
| 2006/0085607 A1 | 4/2006 | Haruma | |
| 2006/0224853 A1 * | 10/2006 | Shimazaki et al. | 711/171 |
| 2007/0103984 A1 * | 5/2007 | Kavuri et al. | 365/185.17 |
| 2007/0206224 A1 | 9/2007 | Nagashima et al. | |
| 2011/0202737 A1 | 8/2011 | Takahashi et al. | |
| 2013/0111221 A1 * | 5/2013 | Fujii et al. | 713/193 |

FOREIGN PATENT DOCUMENTS

| | | |
|---|---|---|
| JP | 2005-267327 A | 9/2005 |
| JP | 2006-113895 A | 4/2006 |
| JP | 2007-233901 A | 9/2007 |
| JP | 2011-192269 A | 9/2011 |

* cited by examiner

*Primary Examiner* — Elias Mamo
(74) *Attorney, Agent, or Firm* — Volpe and Koenig, P.C.

(57) ABSTRACT

The present invention relates to migrating volumes among computers in a computer system. According to the migration method of the present invention, a setting of a storage apparatus is changed so that the volume having been used by the migration source host is accessible by the migration destination host, and then a volume recognition process is performed in the migration destination host. As a result of the volume recognition process, if it is detected in the migration destination host that multiple device files are created in a duplicated manner with respect to a single volume provided by the storage apparatus, the migration destination host deletes the device files created in a duplicated manner leaving one device file.

12 Claims, 11 Drawing Sheets

Fig.3

| PORT NAME | HOST GROUP ID | LUN | LDEV# |
|---|---|---|---|
| 3e243174 aaaaaaaa (I/F 214a) | 0 | 0 | 1 |
| | | 1 | 2 |
| | | 2 | 3 |
| | 1 | 0 | 0 |
| | | 1 | 4 |
| | | 2 | 5 |
| | : | 0 | 6 |
| | | : | : |
| 3e243174 bbbbbbbb (I/F 214b) | 0 | 0 | 2 |
| | | : | : |
| | 1 | 0 | 0 |
| | | : | : |
| : | : | : | : |

Fig.4

| HOST GROUP ID | WWN |
|---|---|
| 0 | 01234567 89ABCDAA |
|   | 01234567 89ABCDA0 |
| 1 | 81245674 AAAAAAAA |
|   | 81245674 AAAAAAAB |
| ⋮ | ⋮ |
|   | ⋮ |

Fig.8

| HBA | INITIAL NUMBER OF VOLS | TOTAL AMOUNT OF I/O (GB/min) |
|---|---|---|
| WWN001 | 2 | 21.2 |
| WWN002 | 1 | 12.3 |
| : | : | : |

Fig.9

| HBA 281 | TARGET PORT NAME 282 | LUN 283 | DISK NAME 284 | VSN 285 | DUPLICATED VOL FLAG 286 |
|---|---|---|---|---|---|
| WWN001 | 3e243174 aaaaaaaa | 0 | hdisk1 | 000001 | 0 |
| WWN001 | 3e243174 aaaaaaaa | 1 | hdisk2 | 000002 | 1 |
| WWN002 | 3e243174 bbbbbbbb | 0 | hdisk3 | 000002 | 0 |
| WWN002 | 3e243174 bbbbbbbb | 1 | hdisk4 | 000003 | 0 |
| .. | | | | .. | .. |

280

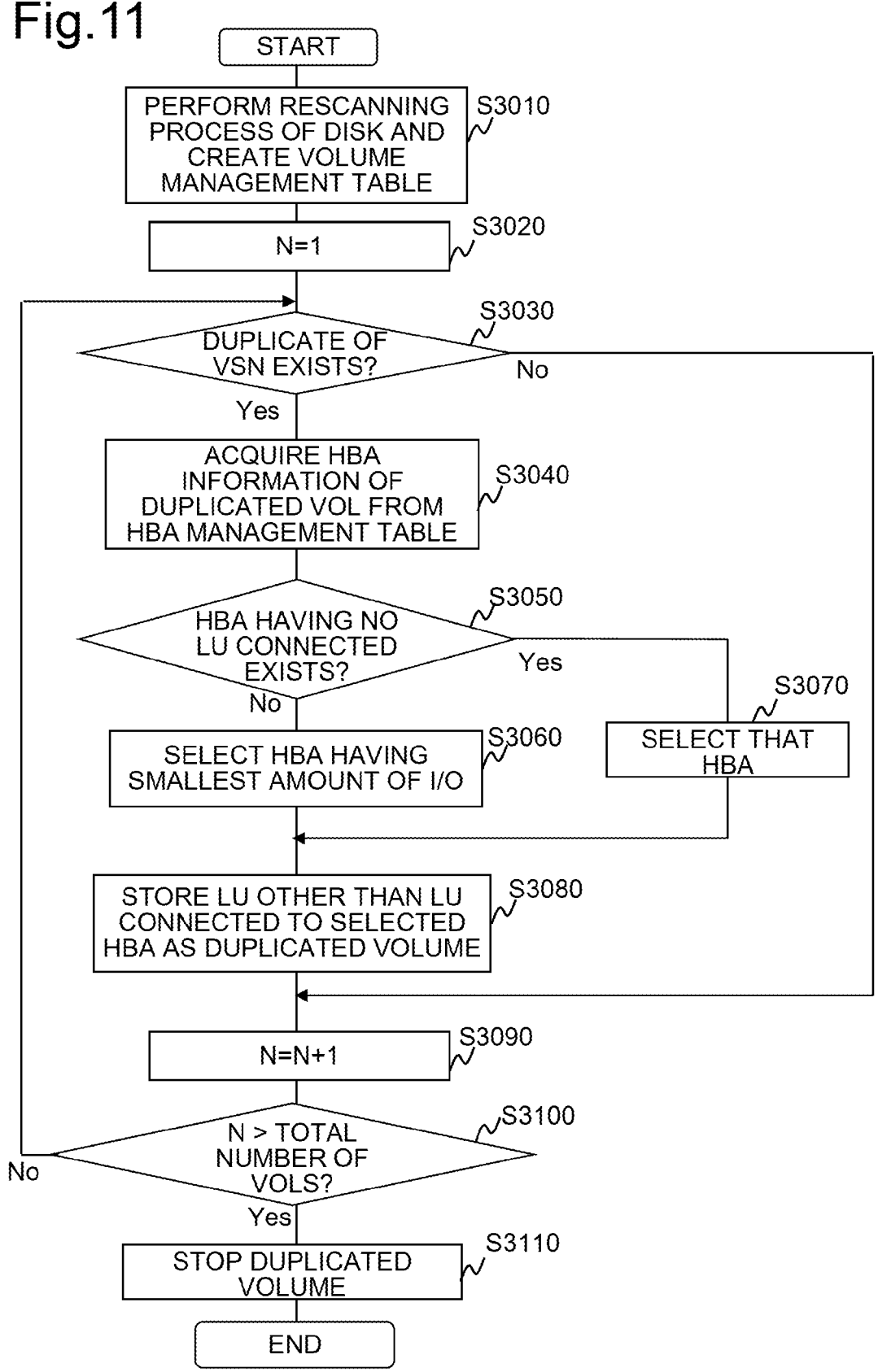

COMPUTER SYSTEM AND METHOD FOR MIGRATING VOLUME IN COMPUTER SYSTEM

TECHNICAL FIELD

The present invention relates to a method for migrating volumes among host computers in a computer system composed of host computers and a storage apparatus.

BACKGROUND ART

Along with the advancement of IT and the spreading of the Internet, the amount of data handled by computer systems in companies and the like is continuously increasing. Therefore, in many computer systems, a storage apparatus (storage system) for storing a large amount of data is provided separately from a built-in storage apparatus of the host computer, adopting a configuration where the respective host computers and the storage system are mutually connected via a device-sharing network such as a SAN (Storage Area Network). Most of the data handled by the respective host computers is stored in the storage system, and the respective host computers access volumes (logical units) provided by the storage system. Such configuration is advantageous in that when replacement of the host computer becomes necessary, the physical movement or replication of the data from a host computer prior to replacing the data (migration source host) to a host computer after replacing the data (migration destination host) is not required, and only a simple operation of connecting the migration destination host to the network and performing setting of the volumes of the storage system used by the migration source host to enable access thereof from the migration destination host is required.

Further, in a computer system handling important data, a configuration is often adopted where many components are duplicated to prevent the occurrence of system stop or the like caused by failure of devices and components. The transmission line (transmission path) connecting the host computers and the storage system is also duplicated, and in many cases, the path connecting the host computers and the volumes of the storage system are duplicated or multiplexed, so that a system is constructed where the remaining paths can be used to continue operation even when failure such as disconnection occurs to a single path. However, in such configuration where multiple paths connecting the volumes of the storage system exist, a single volume within the storage system may seem like multiple volumes to the host computer, so that in order to solve this problem, many host computers adopt a software called an alternate path software in which the multiple volumes visible to the host computer are virtualized as a single volume, and when failure such as disconnection of a path occurs, that failure will not be visible from the host computer. For example, patent literature 1 discloses an art of having a server mounting an HBA (Host Bus Adaptor) where volumes provided from two storage systems are recognized as a single virtual volume.

CITATION LIST

Patent Literature

[PTL 1] Japanese Patent Application Laid-Open Publication No. 2011-192269

SUMMARY OF INVENTION

Technical Problem

The art taught in Patent Literature 1 aims at migrating data among storage apparatuses and moving (replacing) the storage apparatuses, so that during replication (migration) of data from a first storage apparatus (storage 1) to a second storage apparatus (storage 2), the path from the host to storage 1 becomes effective, and when data replication is completed, the path from the host to storage 2 becomes effective so that the migration processing of data extending over storage apparatuses is hidden from the server.

On the other hand, the migration and replacement performed in the computer system not only relates to the migration of storage apparatuses but also includes migration of volumes among host computers accompanying the migration (replacement) of host computers. The migration of host computers includes various forms of migration, depending on the computer system configuration of the user. There are cases where the migration destination host computer and the migration source host computer adopt the exact same specification (such as the same number of HBAs, the same OS being installed, and the same drivers), or cases where migration is performed to a host computer having a different specification. Especially in a case where migration is performed from the migration source host in which alternate path software is operated to the migration destination environment in which alternate path software is not operated, if the path between the host computer and the storage system is duplicated, the single volume within the storage system may seem like multiple volumes to the host computer. Therefore, it is not sufficient to simply take over the setting of the migration source host to the migration destination host, and a complex operation is required of resetting information considering the volume configuration information of the storage system and the configuration information of the network. Patent Literature 1 considers migration among storage apparatuses, but does not consider migration (replacement) of the server computer and the migration of volumes among computers accompanying the migration of the server computer. The object of the present invention is to facilitate and automate the setting operation accompanying server migration.

Solution to Problem

In order to solve the problems of the prior art, the present invention teaches a method for performing host-to-host volume migration in a computer system composed of a migration source host, a migration destination host, a storage apparatus and a system management server. In the present method of performing host-to-host volume migration, when the setting is changed so that the volume of the migration source host can be used by the migration destination host, it is detected that the volume provided by the storage apparatus is recognized as multiple disk devices (duplicated volumes) in the migration destination host, and when duplicated volumes are detected, the duplicated volumes are automatically deleted in the migration destination host.

Further according to a preferred embodiment of the present invention, when duplicated volumes are detected, the other duplicated volumes are deleted except for the volume connected to an HBA having the smallest load out of the multiple HBAs in the host computer.

Advantageous Effects of Invention

The migration method of the present invention characterizes in detecting that volumes provided by the storage apparatus are recognized as multiple volumes (duplicated volumes) in a migration destination host, and when duplicated volumes are detected, deleting the duplicated volumes automatically in the migration destination host. Thereby, even when migration is performed to a migration destination host in which the alternate path software is not operated, the setting of the migration destination host can be facilitated and automate.

BRIEF DESCRIPTION OF DRAWINGS

FIG. 1 is a configuration diagram of a computer system and a storage system according to the present embodiment.
FIG. 2 is a view showing various information and programs stored in memories of a migration source host, a migration destination host, a system management server, a storage management terminal and a storage apparatus.
[FIG. 3]
FIG. 3 is a view showing the contents of an LDEV management table.
[FIG. 4]
FIG. 4 is a view showing the contents of a host group management table.
FIG. 5 is a conceptual diagram illustrating a relationship between a volume provided by the storage apparatus according to the present embodiment and a device file created by the migration source host with respect to the volume.
FIG. 6 is a view illustrating an overall flowchart (1) of a host migration processing according to the preferred embodiment of the present invention.
FIG. 7 is a view illustrating an overall flowchart (2) of a host migration processing according to the preferred embodiment of the present invention.
[FIG. 8]
FIG. 8 is a view illustrating the contents of an HBA management table.
[FIG. 9]
FIG. 9 is a view illustrating the contents of a volume management table.
FIG. 10 is a flowchart of an HBA information confirmation processing.
[FIG. 11]
FIG. 11 is a flowchart illustrating a confirming/stopping process of duplicated volumes.

DESCRIPTION OF EMBODIMENTS

Figure 1:
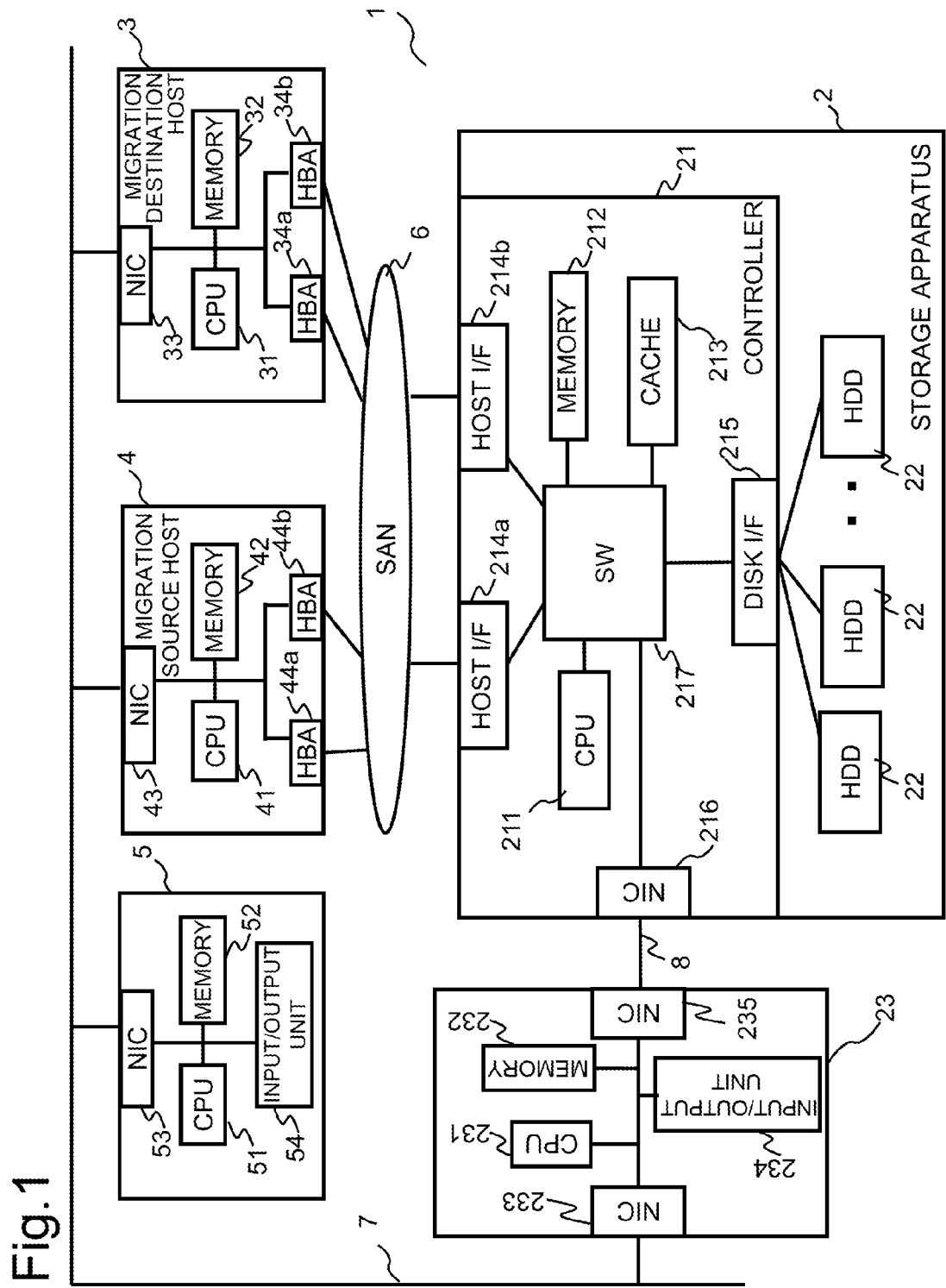
[FIG. 1]

Now, a storage system (storage apparatus) according to a preferred embodiment of the present invention will be described with reference to the drawings. The present invention is not restricted to the preferred embodiment described hereafter.
<Preferred Embodiment>
FIG. 1 illustrates a configuration of a computer system 1 according to a preferred embodiment of the present invention. The computer system 1 is composed of a storage apparatus 2, a migration source host 4, a migration destination host 3, a system management server 5, and a storage management terminal 23. The storage apparatus 2 is connected via a SAN (Storage Area Network) 6 to the migration source host 4 and the migration destination host 3, and also connected via an internal LAN 8 to the storage management terminal 23. Furthermore, the system management server 5 is connected via a LAN 7 to the migration source host 4, the migration destination host 3 and the storage management terminal 23.

The storage apparatus 2 is composed of a storage controller 21 (hereafter abbreviated as "controller") and multiple HDDs 22. The storage controller 21 includes a CPU 211 for controlling the storage apparatus 2, a memory 212 for storing programs executed by the CPU 211 and control information, a cache 213 for temporarily storing a replication of a portion of data of the HDDs 22, host interfaces 214a and 214b (abbreviated as "host I/F" in the drawing; also sometimes referred to as "port") for connecting to the SAN 6, the disk interface 215 (referred to as "disk I/F" in the drawing) for connecting the HDDs 22, an NIC (Network Interface Controller) 216 for connecting the storage management terminal 23, and an internal switch 217 for mutually coupling the above-mentioned components. The configuration of the storage apparatus 2 is not restricted to the configuration illustrated above, and the present invention is applicable, for example, to a configuration where multiple storage controllers 21 or multiple components (such as CPUs 211 and disk I/Fs 215) exist within the storage controller 21.

The migration source host 4 includes, for example, a CPU 41, a memory 42, an NIC 43 for connecting to the LAN 7, and multiple (such as two) HBAs (Host Bus Adaptors) 44a and 44b for connecting to the SAN 6. The migration destination host 3 has a similar configuration as the migration source host 4, and includes a CPU 31, a memory 32, an NIC 33 for connecting to the LAN 7, and multiple (such as two) HBAs 34a and 34b for connecting to the SAN 6.

The system management server 5 includes a CPU 51, a memory 52, an NIC 53 for connecting to the LAN 7, and an input/output unit 43 composed of a keyboard, a mouse, a display and so on. It can also include an HBA for connecting to the SAN 6, similar to the migration source host 4, but it is not an indispensable component.

The storage management terminal 23 is a terminal for performing management operation of the storage apparatus 2, and includes a CPU 231, a memory 232, an NIC 233 for connecting to the LAN 7, an input/output unit 234 such as a keyboard and a display, and an NIC 235 for connecting to the NIC 216 of the storage apparatus 2. Management operation is specifically an operation to perform a security setting (described later) of a volume to define the volume provided to the migration destination host 3 and the like, and this operation can be performed by an administrator of the storage apparatus 2 using the input/output unit 234 of the storage management terminal 23, or the storage management terminal 23 can carry out a given management operation by having a management operation instruction from a program such as a migration management program executed in the system management server 5 arrive via the LAN 7 to the storage management terminal 23.

The SAN 6 is a network used for transmitting an access request (I/O request) or a read data and write data accompanying the access request when the migration source host 4 or the migration destination host 3 accesses (reads or writes) the data stored in a storage area (volume) within the storage apparatus 2, and in the present embodiment, a Fibre Channel is used as the physical media. Other configurations can also be adopted using an Ethernet or other transmission media. The LAN 7 is a transmission path used for the system management server 5 to send a management operation request to the storage management terminal 23 or the host (migration destination host 4 and the like), and an Ethernet can be used as the physical media, for example.

Next, we will describe the functions of various programs and functions of the storage apparatus 2 required to describe the migration method according to the preferred embodiment of the present invention. At first, the volume created within the storage apparatus 2 and the management information used within the storage apparatus 2 for managing the volumes will be described.

The storage apparatus 2 according to the preferred embodiment of the present invention creates one or more logical volumes (also referred to as LDEVs) from one or more HDDs 22. Each logical volume is managed by assigning a unique number within the storage apparatus 2 called a logical volume number (LDEV #). When the logical volume is provided to the host (when the logical volume becomes accessible from the host), a logical unit number (LUN) and a port name are associated with the logical volume. A port name is an identifier for uniquely identifying a port 214a or 214b of the storage apparatus, and according to the present embodiment, a WWN (World Wide Name) which is a unique identifier that the ports 214a and 214b has is used as the port name. Other identifiers can also be used. A logical volume management table 200 (also referred to as "LDEV management table 200") illustrated in FIG. 3 is a table for managing the information of the logical unit number (LUN) and the port name associated with the respective logical volumes within the storage apparatus 2. A port name 200-1 and a LUN 200-3 store the information of the port name and the LUN associated with the logical volume specified in LDEV #200-4. For example, the head entry (row) 200-5 of the logical volume management table 200 of FIG. 3 stores information indicating that the port name 200-1 is "3e243174 aaaaaaaa", the LUN 200-3 is "0", and the LDEV #200-4 is "1" ("3e243174 aaaaaaaa" is a WWN of the port 214a). In this case, the respective host computers connected to the SAN 6 recognize that a volume in which the LUN is 0 exists under port 214a. Hereafter, the volume recognized by the host computer (such as the migration source host 4 or the migration destination host 3) is referred to as a "logical unit" or "LU".

According further to the storage apparatus 2 of the present embodiment, multiple sets of (port name, LUN) can be associated with a single logical volume. For example, according to the LDEV management table 200 of FIG. 3, the information on the logical volume where the LDEV #200-4 is "2" is stored in the second entry (row) 200-6 and also in an entry (row) 200-7 in a lower section. In this case, the host computer recognizes that an LU having a LUN "1" exists in port 214a, and also recognizes that a LU having a LUN "0" exists in port 214b. When the host computer issues an I/O command (such as a read command or a write command) designating the port name (such as a WWN of port 214a) and a LUN (such as number 1), the host computer can access the volume in which the LDEV #200-4 is 2, but even when the host computer issues an I/O command designating the port name (such as a WWN of port 214b) and a LUN (such as number 0), the host computer can access the logical volume in which the LDEV #200-4 is 2.

The storage apparatus 2 according to the present embodiment has a function of enabling a volume to be accessed only from a specific host (one or multiple hosts), and hereafter, this function is referred to as a LUN security function. The LUN security function is a function for registering a WWN of the HBA (44a, 44b, 34a, 34b) of the host (such as the migration source host 4 and the migration destination host 3) capable of accessing the storage apparatus 2 in advance to the storage apparatus 2, so as not to receives requests from hosts having a host WWN that differs from the WWN registered in advance. According to the storage apparatus 2, a host WWN for allowing access to the volume is registered in one of the groups called host groups, and each volume is also registered to one of the host groups. FIG. 4 illustrates the contents of a host group management table 201 for managing the correspondence between host groups and WWNs of host computers. A host group ID 201-1 shows a group number (ID) of a host group, and a WWN 201-2 shows a WWN registered to the host group specified by the host group ID 201-1. For example, in the example of FIG. 4, the head row indicates that the WWN "01234567 89ABCDAA" belongs to a host group in which the host group ID 201-1 is "0". Further, by referring to FIG. 3, the host group ID 200-2 of the volume is "0" in which the port name 200-1 is "3e243174 aaaaaaaa" and the LUN 200-3 is "0". In this example, it means that the host having the WWN "01234567 89ABCDAA" can access this volume. Therefore, when the volume used by the migration source host 4 is to be used by the migration destination host 3, it is necessary to register the information of the WWN of the migration destination host 3 and the information of the volume that the migration destination host 3 must access in the host group management table 201. This registration operation is performed manually by the administrator of the computer system 1 through use of the system management server 5 or the storage management terminal 23. In another possible example, as described in detail later, a program operating in the system management server 5 can automatically register the WWN of the host (migration destination host 3).

Figure 2:
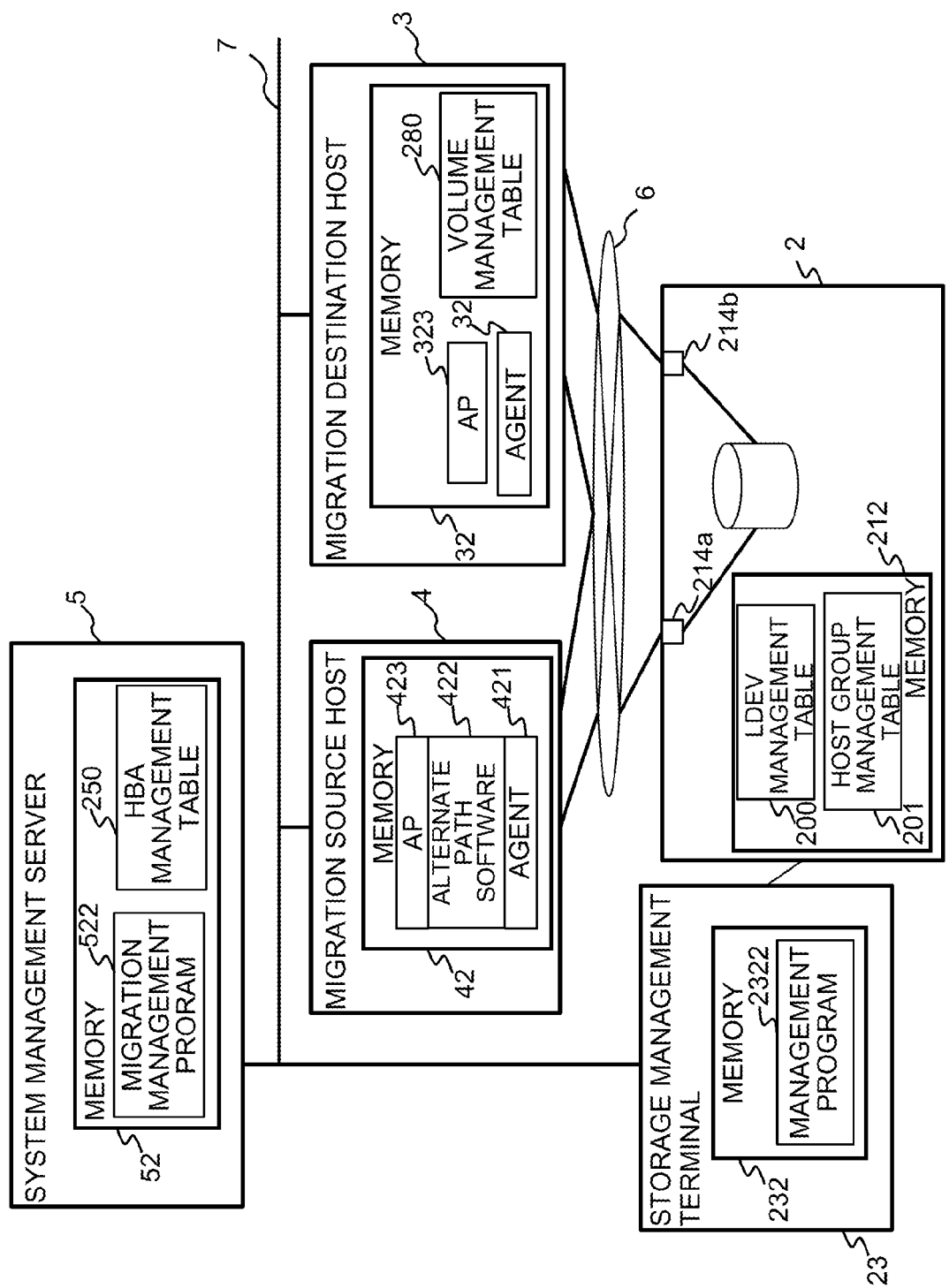
[FIG. 2]

Next, the various information and programs stored in the memories of the migration source host 4, the migration destination host 3, the system management server 5, the storage management terminal 23 and the storage apparatus 2 will be described with reference to FIG. 2.

The memory of the migration source host 4 includes an agent 421, an alternate path software 422 and an application program (AP) 423. In addition thereto, programs such as an operating system (OS) normally installed in a well-known host computer also exist.

The agent 421 is a group of programs for executing commands for acquiring the information on a volume that the migration source host 4 uses (that the OS of the migration source host 4 recognizes), which executes various processes by receiving instructions from a migration management program 522 of a system management server 52. The AP 423 is, for example, a business program such as a database management system (DBMS), but the present invention is applicable regardless of the type of program of the AP 423.

The alternate path software 422 is, for example, a well-known software such as a Hitachi Command Suite Dynamic Link Manager, which enables multiple volumes recognizes by the migration source host 4 to be virtually recognized as a single volume to an upper-level program (such as the AP 423), and when failure occurs to one section in a path between the migration source host 4 to the storage apparatus 2 and one of the volumes out of the multiple volumes recognized by the migration source host 4 cannot be accessed, the program switches the access path so as to hide the failure from the upper-level program. As mentioned earlier, the volume of the storage apparatus 2 can have a set of multiple port names and LUN associated thereto, and for example, in the logical volume management table 200 of FIG. 3, the logical volume in which the LDEV # is 2 has two sets of port names and LUN associated thereto. In this case, how the logical volume is recognized by the host computer (the migration source host 4 or the migration destination host 3) will be described with reference to FIG. 5.

Figure 5:
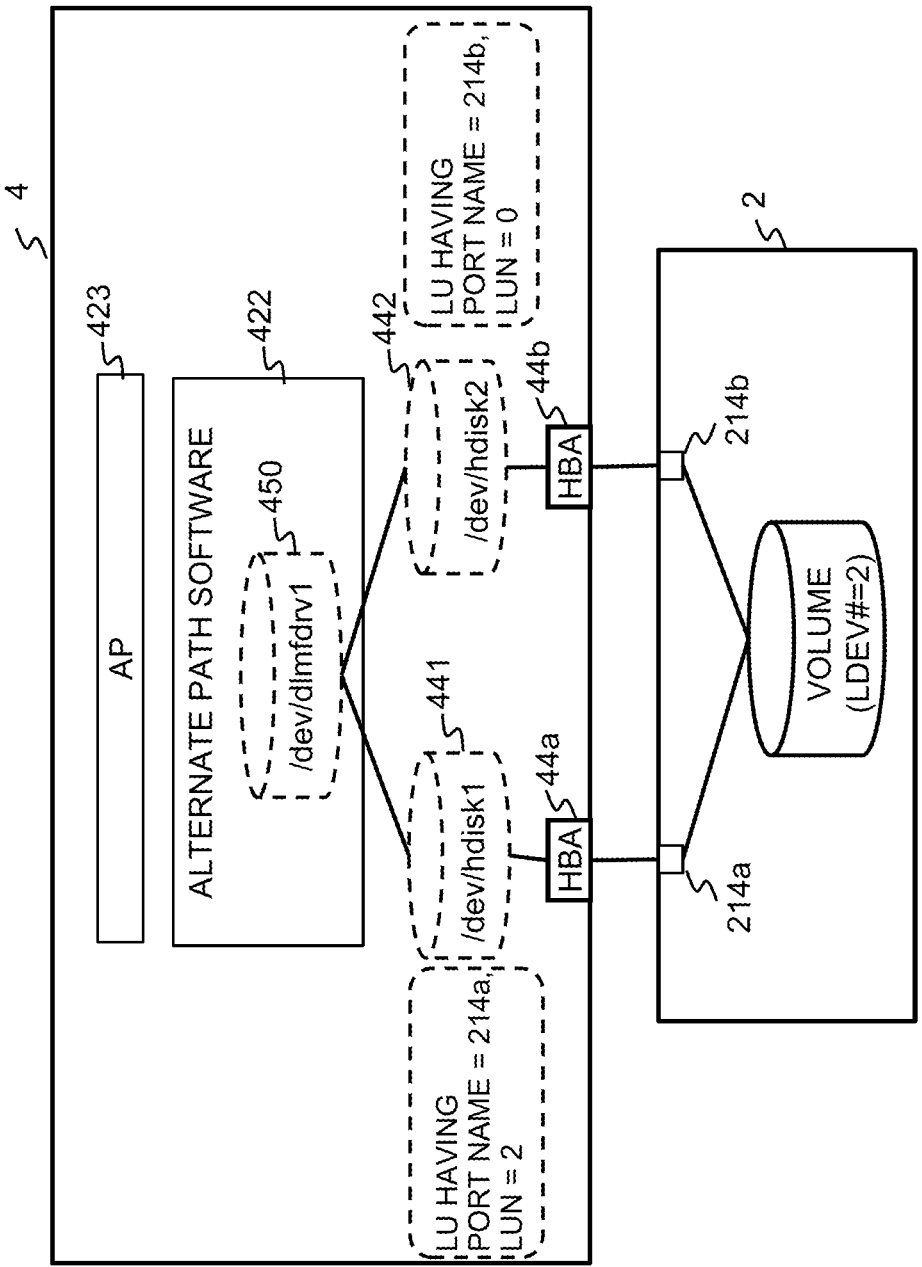
[FIG. 5]

FIG. 5 is a view conceptually illustrating a relationship of device files created and used in the migration source host 4 with respect to the volume provided by the storage apparatus 2 (the volume in which the LDEV # is 2). The storage apparatus 2 and the migration source host 4 are generally connected via a SAN composed of multiple Fibre Channel switches and the like, but for sake of simplifying the description, we will describe a configuration in which a port 214a of the storage apparatus 2 is directly connected with an HBA 44a of the migration source host 4, and a port 214b of the storage apparatus 2 is directly connected with an HBA 44b of the migration source host 4. In this case, the migration source host 4 can recognize the LU existing under the port 214a of the storage apparatus 2 via the HBA 44a, and can recognize the LU existing under the port 214b of the storage apparatus 2 via the HBA 44b. Therefore, the migration source host 4 recognizes that an LU (441) in which the port name is port 214a (more precisely, the port 214a whose WWN is "3e243174 aaaaaaaa", but in order to simplify the description, it is described that "the port name is port 214a") and the LUN number is 1 is connected to the HBA 44a, and that an LU (442) in which the port name is port 214b and the LUN number is 0 is connected to the HBA 44b.

In that case, the OS of the migration source host 4 creates one device file for each of the two volumes respectively (so that a total of two device files are created) (for example, in an IBM AIX operating system, a device file having a name such as /dev/hdisk1, /dev/hdisk2 or the like are created). The upper-level program such as the AP 423 recognizes that a volume exists based on whether such device file exists. When two different device files exist, as in the example illustrated in FIG. 5, the program recognizes that two different volumes exist, even if the actual logical volume associated with these two device files is the same volume.

The alternate path software 422 hides the existence of these two different device files, and shows a single virtual device file (such as /dev/dlmfdrv1) to the upper-level program, so that the upper-level program accesses the virtual device file. When the upper-level program issues an access request designating the virtual device file, the alternate path software 422 automatically converts the request to an access targeting one of the hidden multiple device files (/dev/hdisk1, /dev/hdisk2 or the like).

In the present specification, the device files such as /dev/hdisk1 and /dev/hdisk2 illustrated in FIG. 5 are referred to as follows, in order to distinguish the device files. Taking FIG. 5 as the example, both /dev/hdisk1 and /dev/hdisk2 are created in correspondence with the logical volume (volume in which the LDEV # is 2 defined by the storage apparatus 2), so that a group of device files like /dev/hdisk1 and /dev/hdisk2 associated with a single common volume are referred to as "device files associated with the logical volume" or "device files corresponding to the logical volume". Further, when the /dev/hdisk1 and the /dev/hdisk2 are described in a distinguished manner, since the /dev/hdisk1 is a device file associated with the LU (that seems to be) connected to the HBA 44a, and the /dev/hdisk2 is a device file associated with the LU (that seems to be) connected to the HBA 44b, so that the /dev/hdisk1 is referred to as a "device file associated with the HBA 44a" or a "device file associated with the LU connected to the HBA 44a", and the /dev/hdisk2 is referred to as a "device file associated with the HBA 44b" or a "device file associated with the LU connected to the HBA 44b".

Now, the various information and programs stored in the memory of the migration destination host 3 will be described with reference again to FIG. 2. The memory of the migration destination host 3 includes an agent 321, an application program (AP) 323, and a volume management table 280. The agent 321 and the AP 323 are similar to the agent 421 and the AP 423 of the migration source host 4. In the present embodiment, the migration destination host 3 does not have an alternate path software. The volume management table 280 is created in the migration process according to the present embodiment, and the contents thereof will be described in detail later.

A device file created in the migration source host 4 has been described with reference to FIG. 5, but similarly in the migration destination host 3, a device file is created when a volume accessible from the migration destination host 3 via the HBA 34a and 34b exists. However, since the migration destination host 3 does not have an alternate path software, the host does not have a function to create a virtual device file for hiding multiple device files from an upper-level AP 323 when multiple device files are created with respect to a single logical volume as described in FIG. 5.

A memory 52 of the system management server 5 stores a migration management program 522 and an HBA management table 250. The migration management program 522 is a program for executing a host-to-host volume migration processing described later by communicating with the storage apparatus 2 (storage management terminal 23), the migration source host 4 and the migration destination host 3, and it can be considered as a program for integrally managing the processing of the host-to-host volume migration. The HBA management table 250 is created and used by the migration management program 522 when the migration management program 522 is executed, and this table will be described in detail later.

A memory 232 of the storage management terminal 23 stores a management program 2322, which is a program for executing management operation such as defining a volume in the storage apparatus 2. In the present embodiment, the management program 2322 is executed based on an instruction from the migration management program 522, and the setup processing of the storage apparatus 2 and the like are performed.

Next, we will describe the host-to-host volume migration processing according to the preferred embodiment of the present invention. A host-to-host volume migration processing according to the present invention is a process or operation for changing the setting of the computer system 1 (mainly the storage apparatus 2 and the migration destination host 3) so that the volume (logical volume) of the storage apparatus 2 having been accessed by the migration source host 4 can be accessed by the migration destination host 3. This is an operation that is required when replacing the migration source host 4 with the migration destination host 3, or when (a portion of) the application program having been executed by the migration source host 4 is changed to be executed by the migration destination host 3. The present embodiment assumes that the migration source host 4 includes the alternate path software 422, and by the function of the alternate path software 422, multiple volumes recognized by the migration source host 4 (which is actually the same LDEV within the storage apparatus 2) is provided virtually as a single disk device to the upper-level program, but it is assumed that the migration destination host 3 performs migration in an environment without an alternate path software. Therefore, the simple changing of setting of the storage apparatus 2 to allow the volume having been accessed by the migration source host 4 to be accessed by the migration destination host 3 causes multiple device files to be created in a duplicated manner to a single LDEV to the migration destination host 3 (in the following description, a group of device files created in duplication to a single LDEV is called a "duplicated disk" or a "duplicated volume"), and a state occurs where the volume (device file) to be accessed by the AP 323 or the like of the migration destination host 3 cannot be recognized.

In the host-to-host volume migration processing according to the present invention, when such state occurs, only one device file out of the multiple device files created in a duplicated manner is left remaining while the other device files are deleted. Thus, duplicated disks will not be visible to the AP 323 and the like of the migration destination host 3. However, if such delete processing is performed without any plans, the load may concentrate to a single specific HBA out of the HBAs (34a and 34b) of the migration destination host 3. Therefore, according to the present migration processing, when a device file is to be deleted, the device file associated with an HBA having a low load (such as an HBA having no LU connected thereto) is selectively left remaining, based on the status of load of the HBA of the migration destination host 3.

Figure 6:
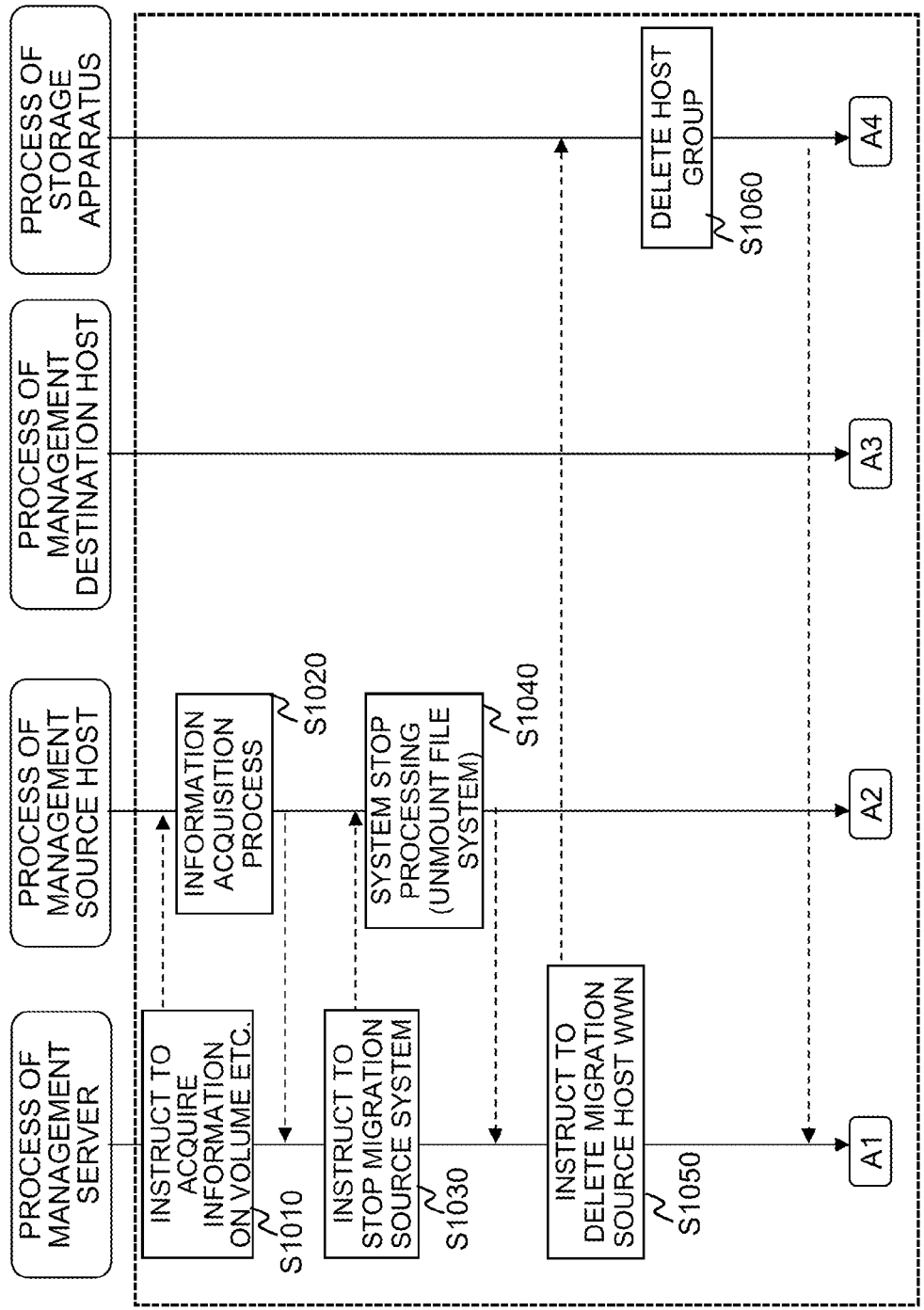
[FIG. 6]
Figure 7:
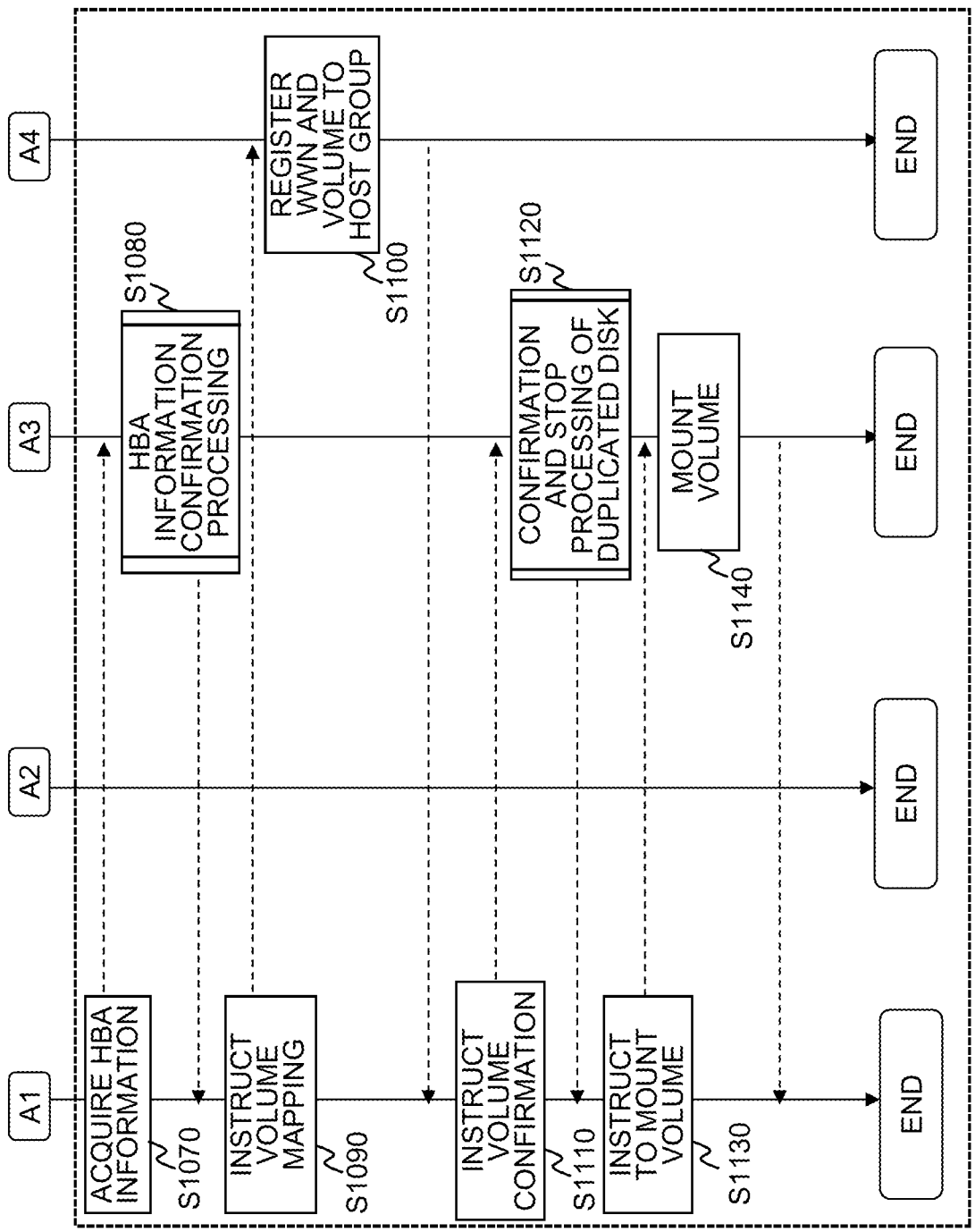
[FIG. 7]

The overall flow of the migration processing of the host will be described with reference to FIGS. 6 and 7. FIG. 6 illustrates the flow of stopping the migration source host 4 and the process of changing the setting of the storage apparatus 2 accompanying the same, while FIG. 7 illustrates the flow of the process of setting performed in the migration destination host 3 which is a process performed successively to the process of FIG. 6.

The migration processing is started when the administrator of the computer system 1 uses the system management server 5 to execute the migration management program 522. The administrator starts the migration management program 522 and hands over the information of the migration source host 4 and the migration destination host 3 (information for specifying the host computer, such as the IP address) to the migration management program 522. Further, when a portion of the volume out of the volumes (LU) used by the migration source host 4 is migrated to the migration destination host 3 (so that the volume can be used by the migration destination host 3), the information regarding the migration target volume must also be handed over to the migration management program 522. However, in the following description, an example of migrating all the volumes used in the migration source host 4 to the migration destination host 3 will be described for sake of simplification of the description.

When the information related to the migration source host 4 and the migration destination host 3 are handed over, the migration management program 522 outputs an instruction to the agent 421 of the migration source host 4 to acquire the information of the volume used (recognized) by the migration source host 4 and the HBAs (44a, 44b) that the migration source host 4 has (S1010). When this instruction is received, the agent 421 of the migration source host 4 acquires the information on the WWN of the volume and the HBAs (44a, 44b), and returns this information to the migration management program 522 (S1020). When the information on the volume and the WWN is acquired from the migration source host 4, the migration management program 522 outputs an instruction to the migration source host 4 to stop (shut down) the host (S1030). Further, at this time, the migration management program 522 stores the information on the volume (LDEV #) that the migration source host 4 uses. In S1040, the migration source host 4 executes shutdown of the host OS. At this time, if the migration source host 4 has created a file system in the volume and used the same, a process for unmounting the file system (volume) is also executed. It is also possible to adopt an operation where the migration source host 4 is not stopped and is left remaining in the computer system 1 during the migration processing, and in that case, the migration source host 4 will not be shut down in S1040, and only the unmounting process of the file system will be executed.

When the migration management program 522 confirms that the migration source host 4 has stopped (the confirmation that the migration source host 4 has stopped can be performed by various well-known methods such as the migration management program 522 transmitting a ping command to the migration source host 4 and confirming whether a response has been received, but since such method is not directly related to the present invention, detailed description thereof will be omitted), a command to delete the host group to which the WWNs of the migration source host 4 are registered is issued to the storage management terminal 23 of the storage apparatus 2 (S1050). Specifically, since the migration management program 522 acquires the information on the WWN of the HBA (44a, 44b) that the migration source host 4 has in S1020, a command to delete the host group to which the WWNs of the HBA (44a, 44b) installed in the migration source host 4 are registered is issued using this information. The storage management terminal 23 having received the command deletes the host group to which the WWN of the HBA (44a, 44b) installed in the migration source host 4 are registered from the LDEV management table 200 and the host group management table 201 (S1060). When a notice notifying that the process of S1060 has been completed is received from the storage management terminal 23, the migration management program 522 moves onto the setup processing in the migration destination host 3.

The flow of the setup process in the migration destination host 3 will be described with reference to FIG. 7. At first, the migration management program 522 outputs an instruction to the agent 321 of the migration destination host 3 to acquire information of the HBAs (34a, 34b) installed in the migration destination host 3 (S1070). When the agent 321 of the migration destination host 3 receives this instruction, it acquires the information of the HBAs (34a, 34b) installed in the migration destination host 3, and returns the same to the migration management program 522 (S1080). The details of the process of S1080 will be described later.

In S1090, the migration management program 522 changes the setting of the storage apparatus 2 so that the logical volume used by the migration source host 4 can be recognized by the migration destination host 3. Specifically, the program instructs the storage management terminal 23 to create a new host group, and to register the information on the WWN of the HBA installed in the migration destination host 3 in that host group. The storage management terminal 23 registers a new host group ID (201-1) to the host group management table, and registers the WWN of the HBAs (34a, 34b) installed in the migration destination host 3 to the WWN (201-2) of the relevant host group. Further, the program registers a new host group and the logical volume used by the migration source host 4 to the LDEV management table 200 (S1100). In the present embodiment, upon registering the logical volume, each logical volume is registered so that it can correspond to any port (214a, 214b) of the storage apparatus 2. At that time, an arbitrary LUN is assigned as the LUN.

Next, in S1110, the migration management program 522 instructs the agent 321 of the migration destination host 3 to confirm and stop the duplicated disk. Upon receiving this instruction, the agent 321 carries out a confirmation and stopping process of the duplicated disk (S1120). The process of S1120 will be described in detail later, but in the process of S1120, a state is created in which the device files corresponding to the logical volume used by the migration source host 4 is formed with respect to the migration destination host 3, and the state (state where duplicated disks exist) where multiple device files are created with respect to a single logical volume is resolved. Hereafter, if necessary (if a file system is constructed in the volume), a volume (file system) mounting process is performed (S1130, S1140), and thereafter, the migration processing is ended.

Next, a process of acquiring information on the HBAs (34a, 34b) included in the migration destination host 3 in S1080 of FIG. 7 will be described, but prior thereto, the content of the HBA management table 250 created in this process will be described with reference to FIG. 8. The HBA management table 250 includes the following items: an HBA 251, an initial number of VOLs 252, and a total amount of I/Os 253. The HBA 251 stores information related to the WWN of the HBA that the migration destination host 3 has. The initial number of VOLs 252 stores the number of volumes (LU) connected to the HBA and specified by the information stored in the HBA 251 (the "volume connected to the HBA" in the present specification refers to the LU that can be recognized (accessible) via the HBA from the migration destination host 3). A well known method can be used to acquire information on HBAs and the information on volumes connected to the HBAs. For example, these information can be acquired via methods such as executing commands (such as an ioscan command in the case of an HP-UX) for acquiring information on devices connected to the host computer included in the OS of the migration destination host 3.

The total amount of I/Os 253 is a field storing a transfer rate of data transfer executed in the HBA specified by the information stored in the HBA 251, that is, the data transfer quantity per unit time. The data transfer executed in the HBA is the data transfer that occurs accompanying the I/O processing to the LU connected to the HBA, so that in storing information in the field of the total amount of I/Os 253, the amount of I/O per minute (GB/min) regarding each LU connected to the HBA is measured, and the sum thereof is stored. This information can be acquired through use of a well-known method, such as execution of a command that the OS of the migration destination host 3 has. In the process for acquiring HBA information in S1080 of FIG. 7, the agent 321 of the migration destination host 3 acquires information stored in the HBA 251, the initial number of VOLs 252 and the total amount of I/Os 253, and creates the HBA management table 250.

Figure 10:
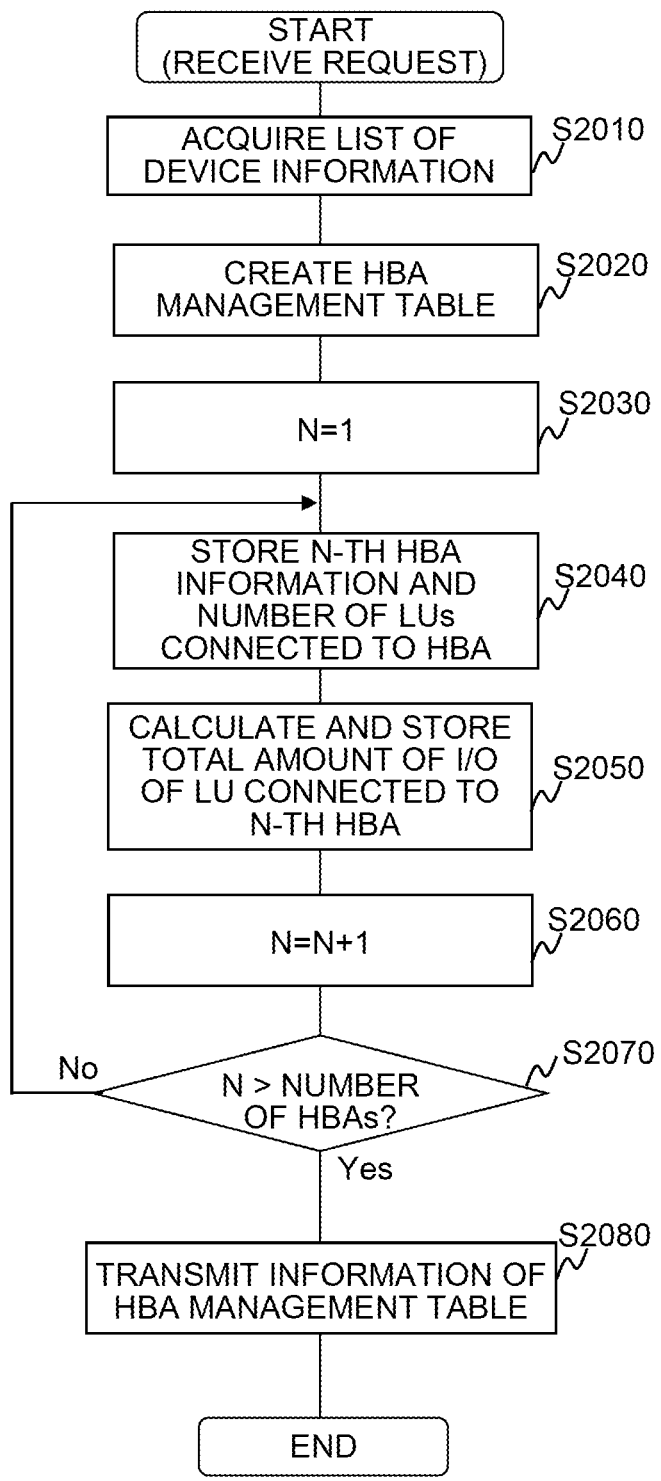
[FIG. 10]

The process for acquiring HBA information executed by the agent 321 in S1080 of FIG. 7 will be described with reference to FIG. 10. When the agent 321 receives a request to acquire HBA information from the migration management program 522, the agent performs a process to acquire information on the devices (such as the HBA or the volume) connected to the migration destination host 3 (S2010). This process can be executed via a well-known method, as mentioned earlier, such as executing a command for acquiring the information on the device connected to the host computer included in the OS of the migration destination host 3. By executing the process of S2010, the agent 321 can recognize the WWN of each HBA connected to the migration destination host 3, the number of HBAs, the number of volumes connected to the respective HBAs, and the name (device file name) of the respective volumes. Thereafter, the agent creates the HBA management table 250 (S2020). At this point of time, no information is stored in the created HBA management table 250. Next, in S2030, a variable N is prepared, and 1 is substituted as an initial value.

In S2040, out of the information on the HBA acquired in S2010, the N-th HBA information is stored in the HBA 251 of the HBA management table 250, and at the same time, the number of LUs connected to the HBA is stored in the field of the initial number of VOLs 252. Further, in S2050, the information on the amount of I/Os (GB/min) is acquired for each LU connected to the Nth HBA, based on which the total amount of I/Os of each volume is calculated and stored in the total amount of I/Os 253.

In S2060, value 1 is added to N, and in S2070, whether or not N has exceeded the number of HBAs connected to the migration destination host 3 is determined. When N is greater than the number of HBAs connected to the migration destination host 3, it means that the processes of S2040 and S2050 are executed for all HBAs and that the creation of the HBA management table 250 has been completed, so that the procedure advances to S2080. If N is equal to or smaller than the number of HBAs connected to the migration destination host 3, the procedure is returned to S2040 since an HBA not subjected to the processes of S2040 and S2050 exists. In S2080, the agent 321 transmits the created HBA management table 250 to the migration management program 522, and ends the process.

The reason for executing the processes of S2040 and S2050 (the process of acquiring the information on the initial number of VOLs 252 and the total amount of I/O 253 and storing the same in the HBA management table 250) is because there is possibly a case where the migration destination host 3 is already introduced to the computer system 1 and is a host executing an operation that differs from the operation performed in the migration source host 4. In that case, it is highly possible that the migration destination host 3 is performing I/O processing with respect to multiple volumes (volumes that differ from the volumes used by the migration source host 4). From the point of view of system design, the volume used in the migration source host 4 should preferably be connected to the HBA having a small amount of I/Os out of the HBAs (such as 34a and 34b) included in the migration destination host 3, so that the information related to the initial number of VOLs 252 and the total amount of I/O 253 are acquired.

Next, we will describe the confirmation and stopping process of the duplicated disk in S1120 of FIG. 7, but prior thereto, the content of the volume management table 280 created during this process will be described with reference to FIG. 9. The volume management table 280 is a table storing information on the volume (LU) recognized by the migration destination host 3, and the respective entries (rows) of this table store information such as the LU recognized by the migration destination host 3 or the device file associated therewith. Each entry includes items corresponding to an HBA 281 storing the WWN of the HBAs (34a, 34b) to which the LU corresponding to the entry is connected, a target port name 282 storing the WWN of the ports (214a, 214b) of the storage apparatus 2 in which the LU corresponding to the entry exists, an LUN 283 storing the LUN of the LU corresponding to the entry, a disk name 284 storing the device file name of the LU corresponding to the entry, a volume serial number (VSN) 285 storing identification numbers specific to the volume, and a duplicated VOL flag 286. In the present embodiment, the LDEV # is stored in the VSN 285. For example, when the migration destination host 3 issues a SCSI inquiry command to the volume (LU) by designating the target port name 282 and the LUN 283, an information on that volume (information such as vender name and serial number) can be acquired, but according to the storage apparatus 2 of the present embodiment, when a SCSI inquire command is received, the information including the logical volume number (LDEV #) is returned to the request source. The logical volume number is stored in the VSN 285. However, the volume information and the information stored in the VSN 285 that the storage apparatus 2 returns to the request source is not restricted to the LDEV #, and any type of identification information can be used to carry out the present invention, as long as the information can uniquely identify a volume within the storage apparatus 2.

The duplicated VOL flag 286 is information showing whether it is a duplicated disk or not, in other words, whether a different device file (information stored in the disk name 284) has been created with respect to the same volume. For example, by referring to the volume management table 280 illustrated in FIG. 9, an entry where the disk name 284 is "hdisk2" and an entry where the disk name 284 is "hdisk3" exist. Normally, when there are device files having different disk names 284 (device file names), the program such as the AP 323 of the migration destination host 3 recognizes the respective device files as different devices (volumes), but in the example of FIG. 9, value "000002" is stored in all the VSN 285 of these entries (in other words, the values are the same). As described, if there are multiple entries having different device file names (disk name 284) but having the same VSN 285, then "1" is stored in the fields of the duplicated VOL flag 286 of the respective entries, excluding a single entry (described in detail later). If the volume is not a duplicated volume, then "0" is stored in the field of the duplicated VOL flag 286.

Hereafter, the process for confirming and stopping the duplicated disk will be described with reference to FIG. 11. When a request to confirm and stop the duplicated disk is received from the migration management program 522, the agent 321 carries out a rescanning process of the disk and creates a volume management table (S3010). The rescanning process of the disk is a process for detecting a volume accessible from the migration destination host 3 and creating a device file corresponding to the detected volume, which can be realized by executing the command that the OS of the migration destination host 3 has. Since prior to the confirmation and stopping process of the duplicate disk, the setting of the storage apparatus 2 is changed (the process of S1100 of FIG. 7 is completed) so that the volume used by the migration source host 4 (more precisely, the volume of the storage apparatus 2 recognized by the migration destination host 4 and in an accessible state) is recognizable and accessible from the migration destination host 3, so that by performing a rescanning process of the disk, the volume used by the migration source host 4 can be newly detected by the migration destination host 3, and a device file corresponding to the volume used by the migration source host 4 will be newly created.

After the rescanning process of the disk, the agent 321 creates the volume management table 280. This process is similar to S2010 of FIG. 10, wherein the information such as the HBA, the LUN, the device file name and the like to which each volume is connected (in other words, the information to be stored in the HBA 281, the target port name 282, the LUN 283, the disk name 284 and the VSN 285 in the volume management table 280) are acquired using the command of the OS, and the volume management table 280 is created, wherein the acquired information is stored in items 281, 282, 283, 284 and 285 of the volume management table 280. Further, "0" is stored in the field of the duplicated VOL flag 286.

As described, the information stored in the VSN 285 uses the LDEV # included in the response information of the SCSI inquiry command as mentioned earlier. Therefore, the agent 321 issues a SCSI inquiry command designating the target port name 282 and the LUN 283 with respect to the respective volumes (respective volumes corresponding to the respective device files), and performs a process to extract the LDEV # included in the response information and storing the same in the VSN 285.

As described earlier, the volume that has been used by the migration source host 4 is in a usable state by the migration destination host 3 at this point of time, so that the volume used by the migration source host 4 and recognized by the migration destination host 3 is also acquired and stored in the volume management table 280.

Thereafter in S3020, a variable N is prepared, and 1 is substituted as the initial value. The processes from S3030 to S3100 are executed with respect to each row (each volume) stored in the volume management table 280 created in S3010. In S3030, an N-th row (entry) is selected from the volume management table 280, and the VSN 285 of that entry and the VSN 285 of other rows is compared, so as to extract an entry having the same (duplicated) VSN as the VSN 285 of the N-th entry. In the example of FIG. 9, the VSN 285 of the volume in which the disk name 284 is "hdisk2" is "000002", and the VSN 285 of the volume in which the disk name 284 is "hdisk3" is also "000002", so that the entry of the volume having the disk name 284 "hdisk3" is extracted. If there is an entry having the same (duplicated) VSN, the procedure advances to S3040. If there is no entry where the VSN is duplicated, the procedure advances to S3090.

In S3040, the agent 321 acquires the HBA management table 250 from the migration management program 522, and extracts an entry corresponding to the HBA (the HBA specified by the information of the HBA 281 in the volume management table 280) to which the LU corresponding to the N-th entry of the volume management table 280 and the LU detected in S3030 (duplicated volume) is connected. In the example of FIG. 9, the HBA 281 to which the LU having a disk name 284 of "hdisk2" is connected is "WWN001", and the HBA 281 to which the LU having the same VSN 285 as the LU having a disk name 284 of "hdisk2" (in other words, a volume in which the disk name 284 is "hdisk3") is connected is "WWN002". Therefore, based on the HBA management table 250 of FIG. 8, a process for extracting the entry in which the HBA 251 is "WWN001" and the entry in which the HBA is "WWN002" will be performed.

In S3050, the HBA that did not have an LU connected thereto before the migration processing will be searched. Specifically, the procedure determines whether an entry where the initial number of VOLs 252 is 0 exists or not out of the entries extracted in S3040 (the entries within the HBA management table 250). If there is an entry where the initial number of VOLs 252 is 0, the procedure advances to S3070, and the entry in which the initial number of VOLs 252 is 0 is selected as a candidate (S3070). If there are multiple entries in which the initial number of VOLs 252 is 0, a single entry (such as the entry detected earlier out of the entries in which the initial number of VOLs 252 is 0) is selected. If there is no entry where the initial number of VOLs 252 is 0 in the detection step of S3050, the procedure advances to S3060.

In S3060, the entry having the smallest total amount of I/Os 253 is selected as a candidate out of the entries extracted in S3040. Taking the HBA management table 250 in the state of FIG. 8 as an example, the total amount of I/Os 253 of the entry where the HBA 251 is "WWN001" is 21.2 GB/min and the total amount of I/Os 253 of the entry where the HBA 251 is "WWN002" is 12.3 GB/min, so that the entry where the HBA 251 is "WWN002" is selected.

In S3080, out of the volumes selected in S3030, the device file associated with the LU other than the LU connected to the HBA (HBA 251) of the entry selected in S3060 or S3070 is assumed to be a duplicated volume (duplicated disk), so that "1" is stored in the duplicated VOL flag 286 of the volume management table 280. A case where the second entry (the entry of the LU in which the disk name 284 is "hdisk2") in the volume management table 280 and the third entry (the entry of the LU in which the disk name 284 is "hdisk3") as the duplicated volume entry are selected in S3030 will be taken as an example. At this time, the procedure advances to S3060, and in S3060, an entry where the HBA 251 is "WWN002" is selected. Therefore, "0" is stored in the duplicated VOL flag 286 of the entry associated with the LU connected to the HBA in which the WWN of the HBA is "WWN002" out of the entries associated with the multiple (duplicated) LUs selected in S3030, and "1" is stored in the duplicated VOL flag 286 of the entry (third entry, that is, the entry of the LU in which the HBA 281 is connected to the HBA of "WWN001") other than the LU connected to the HBA in which the WWN of the HBA is "WWN002".

Depending on the configuration of the migration destination host 3 or the storage apparatus 2, there may be a case where duplicated disks exist (multiple device files associated with the same LDEV exist) with respect to a single HBA selected in S3060 or S3070. In that case, in S3080, "1" is stored in the duplicated VOL flag 286 for the multiple device files associated with the selected HBA, except for an arbitrary single device file.

In S3090, 1 is added to N, and in S3100, whether the value of N exceeds the number of entries (total number of volumes connected to the migration destination host 3) registered in the volume management table 280 or not is determined. If the value of N is greater than the number of entries registered in the volume management table 280, it means that the confirmation of duplicated disks has been completed for all volumes, so that the procedure advances to S3110. If N is equal to or smaller than the number of entries registered in the volume management table 280, the procedure returns to S3030. In S3110, the agent 321 executes a stop processing of the volume where "1" is entered to the duplicated VOL flag 286 in the entries of the volume management table 280. The stop processing is performed by deleting the device files corresponding to the volume. The delete processing of the device file is realized by the agent 321 executing a management command (such as an rmsf command if the OS is HP-UX, and an rmdev command if the OS is AIX) included in the OS of the migration destination host 3. When the stop processing is completed, the agent 321 notifies the migration management program 522 that the information and processing of the volume management table 280 has been completed, and ends the confirmation and stopping process of the duplicated disk.

According to the migration method of the present embodiment, in a computer system composed of the migration source host, the migration destination host, the storage apparatus and the management server, it is detected that the volume provided by the storage apparatus to the migration destination host is recognized as multiple volumes (duplicated volumes), and when a duplicated volume is detected, the duplicated volume is automatically deleted in the migration destination host. Therefore, even if the configuration of the software loaded in the migration destination host differs from the migration source host, and if there is no alternate path in the migration destination host, it becomes possible to automatically prevent a state where the duplicated volume is visible to the operation program of the migration destination host.

The preferred embodiment of the present invention has been described, but the embodiment is a mere example for illustrating the present invention, and the present invention should not be interpreted to be restricted to the described embodiment. Various modifications are possible in the present invention. For example, according to storage apparatus 2 described in the present embodiment, the number of controllers 21, the host I/Fs (214a, 214b) and the disk I/Fs 215 within the storage apparatus 2 is not restricted to the numbers illustrated in FIG. 1, but can adopt a configuration where two or more controllers 21 and disk I/Fs 215 are included, or three or more host I/Fs are included. The present invention is also effective in a configuration where a single host I/F is adopted. The number of HBAs of the migration source host 4 and the migration destination host 3 is not restricted to two. Further, a configuration can be adopted where the function of the storage management terminal 23 is adopted in the controller 21 of the storage apparatus 2, and the system management server 5 directly performs management operation of the storage apparatus 2.

The migration management program 522 of the present embodiment can adopt an arrangement where the program is executed other than in the system management server 5, that is, executed in the migration destination host 3. According further to the present embodiment, the confirmation and stopping process of the duplicated disk (S1120 of FIG. 7, the process of FIG. 11) is executed by the agent 321 of the migration destination host 3, but a configuration can be adopted where a portion of the process is executed by the system management server 5. Actually, the processes that must be executed by the migration destination host 3, such as the scanning, acquiring information and deleting of a device file as in steps S3010 or S3110 of FIG. 11, can be executed by the migration destination host 3, while the information (such as the volume management table 280) necessary for executing the remaining processes (S3020-S3100) are transmitted from the migration destination host 3 to the system management server 5, so that the processes of S3020 to S3100 can be executed in the system management server 5.

Moreover, the components described as programs in the preferred embodiment can also be realized via hardware using a hardwired logic or the like. Further, a configuration can be adopted where the various programs in the embodiments are stored and provided in storage media such as CD-ROMs and DVDs

[Reference Signs List]
1: Computer system
2: Storage apparatus
3: Migration destination host
4: Migration source host
5: System management server
6: SAN
7: LAN
8: Internal LAN
21: Storage controller
22: HDD
23: Storage management terminal

The invention claimed is:

1. A computer system comprising a migration source computer, a migration destination computer, and a storage apparatus connected to the migration source computer and/or the migration destination computer via a network and providing one or more volumes to the migration source computer and/or the migration destination computer: wherein
the migration destination computer has multiple host bus adaptors (HBAs) for connecting to the storage apparatus;
the migration destination computer
acquires, for each of the multiple host bus adaptors, a number of volumes accessible via the host bus adaptor;

thereafter detects the volume of the storage apparatus which has been used by the migration source computer;

creates one or more device files associated with the volume and used by the migration destination computer to access the volume of the storage apparatus which has been used by the migration source computer; and when multiple device files corresponding to one of the volumes are created, leaves one device file associated with the host bus adaptor where the acquired number of volumes accessible via the host bus adaptor is 0 out of the multiple device files created corresponding to the volume and deletes the other device files.

2. The computer system according to claim 1, wherein the migration destination computer acquires for each device file an identification information of the volume corresponding to the device file from the storage apparatus, and if identification information of the volume corresponding to at least two of said device files are the same, the system determines that multiple device files corresponding to a single volume out of the volumes have been created.

3. The computer system according to claim 1, wherein
prior to creating one or more device files associated with the volume, the migration destination computer acquires information on a data transfer rate of the host bus adaptor for each of the multiple host bus adaptors; and
if multiple device files corresponding to the volume is created, the system leaves one device file associated with a host bus adaptor where a data transfer rate of the host bus adaptor is smallest out of the multiple device files created corresponding to the volume.

4. The computer system according to claim 1, further comprising
a management server for managing a migration processing which is a process for changing the setting of the computer system so that the volume having been accessed by the migration source computer can be accessed by the migration destination computer;
the storage apparatus retains a management information storing a correspondence between the volume and an identifier of a computer connected to the storage apparatus via the network, and is designed so that the volume cannot be accessed from a computer not having the identifier stored in the management information;
before the migration destination computer executes a process to create one or more device files associated with the volume, the management server executes the following processes of:
(1) having the storage apparatus delete information related to a correspondence between the identifier of the migration source computer and the volume used by the migration source computer from the management information;
(2) having the migration destination computer acquire information on a number of accessible volumes via the host bus adaptor and a data transfer rate of the host bus adaptor for each of the multiple host bus adaptors; and
(3) having the storage apparatus store the correspondence relationship between the identifier of the migration destination computer and the volume used by the migration source computer in the management information.

5. The computer system according to claim 4, wherein after executing the aforementioned process (3), the management server instructs the migration destination computer to:
detect a volume of the storage apparatus, and create one or more device files associated with the volume; and
when multiple device files corresponding to a single volume within the multiple volumes are created, leave one device file associated with a host bus adaptor in which the number of accessible volumes via the host bus adaptor is 0 out of the multiple device files created corresponding to the volume.

6. The computer system according to claim 5, wherein if there is no host bus adaptor in which the number of accessible volumes via the host bus adaptor is 0, the migration destination computer leaves one of the created multiple device files associated with a host bus adaptor having a smallest data transfer rate out of the created multiple device files corresponding to the volume.

7. A method for migrating a volume in a computer system comprising a migration source computer, a migration destination computer, and a storage apparatus connected to the migration source computer and/or the migration destination computer via a network and providing one or more volumes to the migration source computer and/or the migration destination computer: wherein
the migration destination computer has multiple host bus adaptors (HBAs) for connecting to the storage apparatus;
the migration destination computer
acquires, for each of the multiple host bus adaptors, a number of volumes accessible via the host bus adaptor;
thereafter detects the volume of the storage apparatus which has been used by the migration source computer; which has been used by the migration source computer; and
when multiple device files corresponding to one of the volumes are created, leaves one device file associated with the host bus adaptor where the acquired number of volumes accessible via the host bus adaptor is 0 out of the multiple device files created corresponding to the volume and deletes the other device files.

8. The method for migrating a volume in a computer system according to claim 7, wherein the migration destination computer acquires for each device file an identification information of the volume corresponding to the device file from the storage apparatus, and if identification information of the volume corresponding to at least two of said device files are the same, determines that multiple device files corresponding to a single volume out of the volumes have been created.

9. The method for migrating a volume in a computer system according to claim 7, wherein
prior to creating one or more device files associated with the volume, the migration destination computer acquires information on a data transfer rate of the host bus adaptor for each of the multiple host bus adaptors; and
if multiple device files corresponding to the volume is created, leaves one device file associated with a host bus adaptor where the data transfer rate of the host bus adaptor is smallest out of the multiple device files created corresponding to the volume.

10. The method for migrating a volume in a computer system according to claim 7, further comprising
a management server for managing a volume migration processing;
the storage apparatus retains a management information storing a correspondence between the volume and an identifier of a computer connected to the storage apparatus via the network, and is designed so that the volume cannot be accessed from a computer not having the identifier stored in the management information;
before the migration destination computer executes a process to create one or more device files associated with the volume, the management server executes the following processes of:

(1) having the storage apparatus delete information related to a correspondence between the identifier of the migration source computer and the volume used by the migration source computer from the management information;

(2) having the migration destination computer acquire information on a number of accessible volumes via the host bus adaptor and a data transfer rate of the host bus adaptor for each of the multiple host bus adaptors; and (3) having the storage apparatus store the correspondence relationship between the identifier of the migration destination computer and the volume used by the migration source computer in the management information.

11. The method for migrating a volume in a computer system according to claim 10, wherein after executing the aforementioned process (3), the management server instructs the migration destination computer to detect a volume of the storage apparatus, and create one or more device files associated with the volume; and when multiple device files corresponding to a single volume within the multiple volumes are created, leaves one device file associated with a host bus adaptor in which the number of accessible volumes via the host bus adaptor is 0 out of the multiple device files created corresponding to the volume.

12. The method for migrating a volume in a computer system according to claim 11, wherein if there is no host bus adaptor in which the number of accessible volumes via the host bus adaptor is 0, the migration destination computer leaves one of the created multiple device files associated with a host bus adaptor having a smallest data transfer rate out of the created multiple device files corresponding to the volume.

\* \* \* \* \*